United States Patent
Gerlach et al.

(10) Patent No.: US 11,121,399 B2
(45) Date of Patent: Sep. 14, 2021

(54) BATTERY CELL AND METHOD OF MANUFACTURING A BATTERY CELL

(71) Applicants: Robert Bosch GmbH, Stuttgart (DE); GS Yuasa International Ltd., Kyoto (JP)

(72) Inventors: Martin Gerlach, Strullendorf (DE); Juergen Herold, Weismain (DE); Florian Postler, Schesslitz (DE); Christoph Schlund, Bamberg (DE); Franz Brieger, Munich (DE)

(73) Assignees: Robert Bosch GmbH, Stuttgart (DE); GS Yuasa International LTD., Kyoto (JP)

( * ) Notice: Subject to any disclaimer, the term of this patent is extended or adjusted under 35 U.S.C. 154(b) by 146 days.

(21) Appl. No.: 16/468,970

(22) PCT Filed: Jan. 15, 2018

(86) PCT No.: PCT/EP2018/050896
§ 371 (c)(1),
(2) Date: Jun. 12, 2019

(87) PCT Pub. No.: WO2018/134157
PCT Pub. Date: Jul. 26, 2018

(65) Prior Publication Data
US 2020/0083557 A1 Mar. 12, 2020

(30) Foreign Application Priority Data
Jan. 19, 2017 (EP) .................................. 17152144

(51) Int. Cl.
*H01M 10/0525* (2010.01)
*H01M 50/54* (2021.01)
(Continued)

(52) U.S. Cl.
CPC ..... *H01M 10/0525* (2013.01); *H01M 50/103* (2021.01); *H01M 50/538* (2021.01); *H01M 50/54* (2021.01)

(58) Field of Classification Search
None
See application file for complete search history.

(56) References Cited

U.S. PATENT DOCUMENTS

| | | |
|---|---|---|
| 2002/0094478 A1 | 7/2002 | Holland |
| 2009/0094478 A1 | 4/2009 | Harper et al. |

(Continued)

FOREIGN PATENT DOCUMENTS

JP 2005190885 A 7/2005

OTHER PUBLICATIONS

European Office Action corresponding to European application No. 17 152 144.6 dated May 3, 2020 (6 pages).

(Continued)

*Primary Examiner* — Wyatt P McConnell
(74) *Attorney, Agent, or Firm* — Maginot, Moore & Beck, LLP

(57) ABSTRACT

The invention relates to a battery cell (2), in particular a prismatic lithium ion cell, the battery cell (2) comprising an electrode assembly (4), a battery case (6) for housing the electrode assembly (4) and a cap assembly (S) for closing the battery case (6), the cap assembly (S) comprising a set of terminals (10) arranged thereon, wherein the electrode assembly (4) comprises first electrode plates (14), separator plates and second electrode plates (16) stacked on one another, wherein electrode tabs (12) are provided to electrically connect the electrode assembly (4) with the terminals (10). The electrode tabs (12) are bent at least once in a (Continued)

Figure 1A:
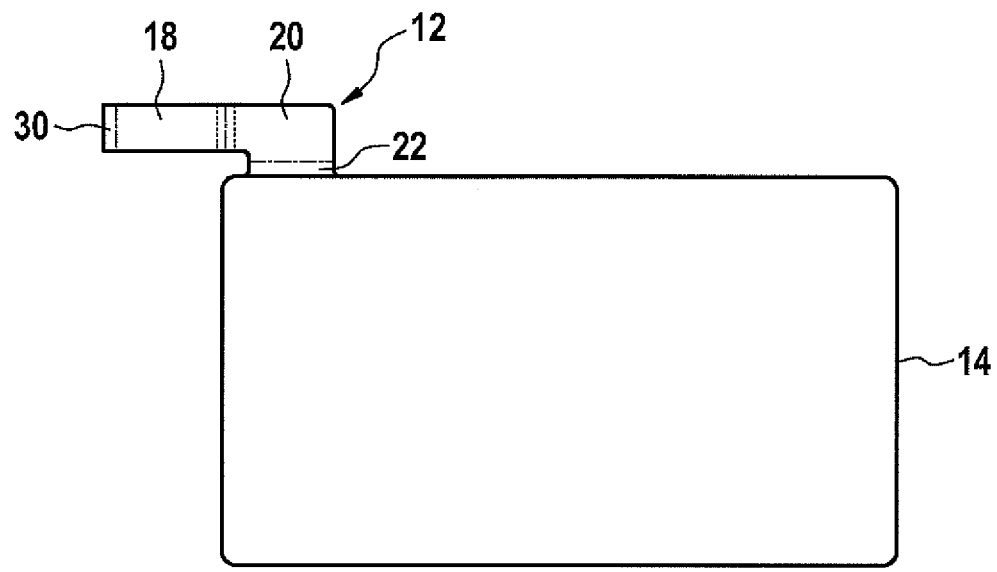

direction normal to the first and second electrode plates (14, 6). Furthermore, the invention relates to a method of manufacturing a battery cell (2).

15 Claims, 6 Drawing Sheets

(51) Int. Cl.
*H01M 50/103* (2021.01)
*H01M 50/538* (2021.01)

(56) References Cited

U.S. PATENT DOCUMENTS

| | | | |
|---|---|---|---|
| 2013/0216872 A1 | 8/2013 | Fuhr et al. | |
| 2016/0036009 A1* | 2/2016 | Cho | H01M 2/021 429/179 |

OTHER PUBLICATIONS

International Search Report corresponding to international application No. PCT/EP2018/050896 dated Mar. 9, 2018 (3 pages).

\* cited by examiner

BATTERY CELL AND METHOD OF MANUFACTURING A BATTERY CELL

This application is a 35 U.S.C. 371 National Stage application of PCT/EP2018/050896, filed Jan. 15, 2018, which claims priority to European Application No. EP 17152144.6, filed on Jan. 19, 2017. The entire contents of the above-mentioned PCT and European patent applications are incorporated herein by reference as part of the disclosure of this U.S. application.

The invention relates to a battery cell and to a method of manufacturing a battery cell.

PRIOR ART

In the present disclosure, the terms "battery" and "battery cell" are used. These expressions are understood to encompass primary cells as well as secondary cells, i.e. accumulator cells. A battery typically comprises a set of battery cells electronically linked to each other.

Jelly rolls or stacked battery cells of the lithium ion type typically consist of cathode electrode material on an aluminum foil (positive electrode), anode electrode material on a copper foil (negative electrode) and a separator soaked in electrolyte. The jelly roll is made by rolling these elements together. The stacked battery cell is created by stacking these elements in layers on one another. The current collector tabs of the jelly rolls or stacks, hereinafter also called electrode tabs, are then connected with terminals and the complete assembly is sealed hermetically in aluminum or steel cans.

During the charge of lithium ion cells, the lithium ions are migrating from the cathode by dint of electrolyte across the separator to the anode simultaneously with an electron flow in the same direction on the external circuit. During discharge, these processes are taking place in the opposite direction.

US 2015/0364727 shows a rechargeable battery including a plurality of electrode assemblies arranged in a case. The electrode tabs are welded to a bottom surface of a flange of a terminal connected to the cap assembly. The electrode tabs are bent at least once in a direction parallel to the first and second electrode plates.

US 2007/0105015 discloses a U-shaped electrode lead via which a terminal for a battery cover is connected to an electrode of a power-generating element. The electrode lead is bent twice in a direction parallel to the first and second electrode plates.

It is an objective of the present invention to decrease the "dead volume" below the cap plate, i.e. the volume occupied by current-collecting means and the external connection of the electrode assembly.

It is another objective of the present invention to provide a faster and easier method of manufacturing a battery cell.

SUMMARY OF THE INVENTION

In a first aspect, the present invention proposes a battery cell, in particular a prismatic lithium ion cell, the battery cell comprising an electrode assembly, a battery case for housing the electrode assembly and a cap assembly for closing the battery case, the cap assembly comprising a set of terminals arranged thereon. The electrode assembly comprises first electrode plates, separator plates and second electrode plates stacked on one another. Electrode tabs are provided to electrically connect the electrode assembly with the terminals. The electrode tabs are bent at least once in a direction normal to the first and second electrode plates.

The term "normal to the first and second electrode plates" is understood as follows: The electrodes are essentially plate-like and typically consist of active material on metal foils. In case of a lithium ion type, the cathode electrode material may be coated on an aluminum foil, and the anode electrode material may be coated on a copper foil. The plates are stacked on one another such that they are arranged in parallel. The direction perpendicular to the plates is the normal direction. The electrode tabs being bent in the direction normal to the first and second electrode plates means that the folding line is perpendicular to the plane of the electrode plates.

According to an embodiment, the electrode assembly comprises a first and a second electrode step. Two stacks are considered to minimize the scrap rate in the production line. The stacks are stacked on one another.

According to an embodiment, the electrode tabs of the first stack are first folded onto the electrode tabs of the second stack and then bent at least once in the direction normal to the first and second electrode plates. Once folded, the area of the folds is more compact. Furthermore, the electrode tabs of the electrodes being folded on one another, allows for a lesser number of tabs to be connected with the terminals. Furthermore, a lesser number of tabs to be connected with the terminals leads to a higher welding efficiency Preferably, the electrode tabs are directly connected to the terminals. In this embodiment, there is no need for an additional connection part, e.g. connection part 7 in US 2007/0105015. The specific folded arrangement results in a lowering of the height of the folded area because welding of the electrode tabs to the additional connection part is not required. Therefore, for a fixed total height of the battery cell, the relative height of the electrode assembly can be increased.

According to an embodiment, at least one isolating member is arranged on the electrode tabs. Particularly, the isolating member can be arranged on the electrode tabs of the first stack folded on the electrode tabs of the second stack.

According to an embodiment, the electrode tabs are provided at the corner of the electrode assembly. An advantage of this embodiment is that the terminals of the cap assembly can also be arranged more closely to the edge of the cap assembly such that the elements from the center of the cap assembly, in particular the bursting membrane, may be designed more freely, e.g. the bursting membrane can be designed larger.

In another aspect, the invention provides a method of manufacturing a battery cell, in particular a prismatic lithium ion cell, the method comprising a step of providing an electrode assembly, where the electrode assembly comprises first electrode plates, separator plates and second electrode plates stacked on one another, the electrode plates being provided with electrode tabs for the external electric connection of the electrode assembly, a step of bending the electrode tabs at least once in a direction normal to the first and second electrode plates, a step of providing a cap assembly for closing the battery case, the cap assembly comprising a set of terminals arranged thereon, a step of electrically connecting the electrode tabs with the terminals, a step of providing a battery case for housing the electrode assembly, a step of housing the electrode assembly in the battery case, and a step of closing the battery case with the cap assembly.

The method of manufacturing the battery cell may be finished by the steps of filling the battery case with a liquid electrolyte and by sealing the battery case hermetically.

An advantage of using the cap plate fixation according to the present invention is that a rotating process of the cap plate can be avoided. The invention allows for a vertical positioning of the cap plate relative to the stack.

According to an embodiment, the electrode assembly comprises a first and a second stack. The method may then further comprise a step of folding the electrode tabs of the first stack onto the electrode tabs of the second stack, the step being followed by the step of bending the electrode tabs at least once in the direction normal to the first and second electrode plates.

According to an embodiment, the electrode tabs extend over the edges of the electrode assembly before being bent at least once in the direction normal to the first and second electrode plates. Since free-standing protruding electrode tabs can be easily handled by machines, this allows for easy manufacture.

According to an alternative embodiment, the electrode tabs extend towards the center of the electrode assembly before being bent at least once in the direction normal to the first and second electrode plates.

According to preferred embodiments, the step of electrically connecting the electrode tabs with the terminals comprises laser welding, ultrasound welding or clinching technology.

Advantages of the Invention

The invention allows for an increased active area of electrodes as well as of a reduction of dead volume and, consequently, an increase in the overall energy density of the battery cell.

Furthermore, the invention allows for a cheap and less complicated method of manufacturing such a battery cell.

SHORT DESCRIPTION OF THE DRAWINGS

Exemplary embodiments of the invention are depicted in the following figures and will be explained in the following description of the figures.

Figure 1B:
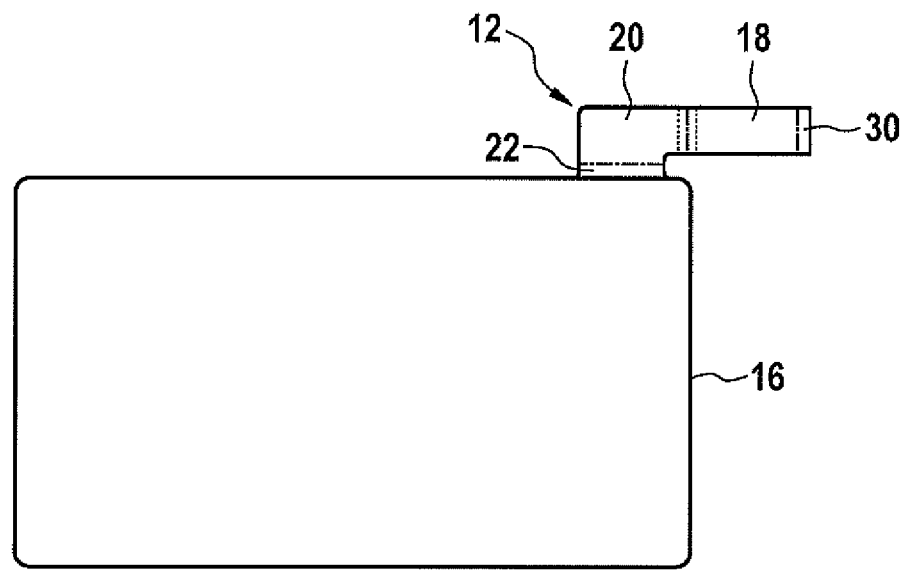
Figure 2A:
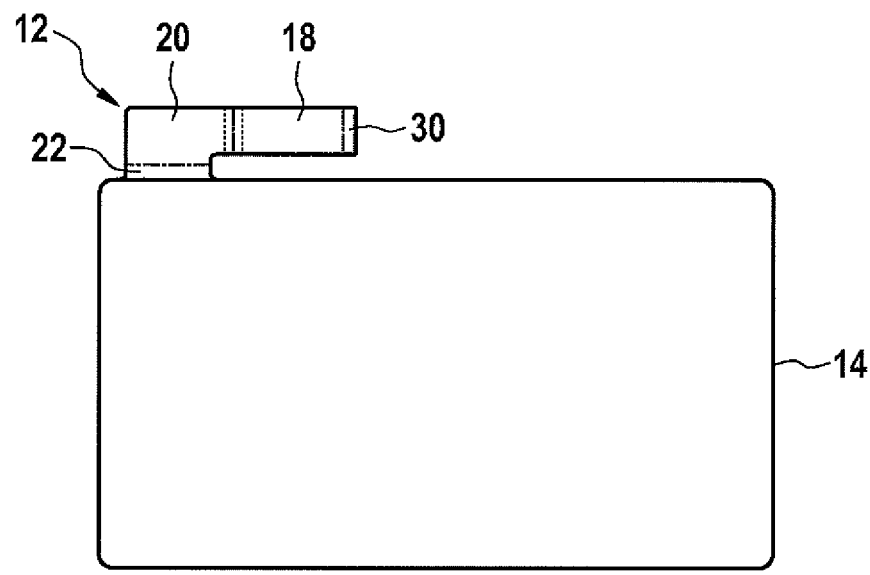
Figure 2B:
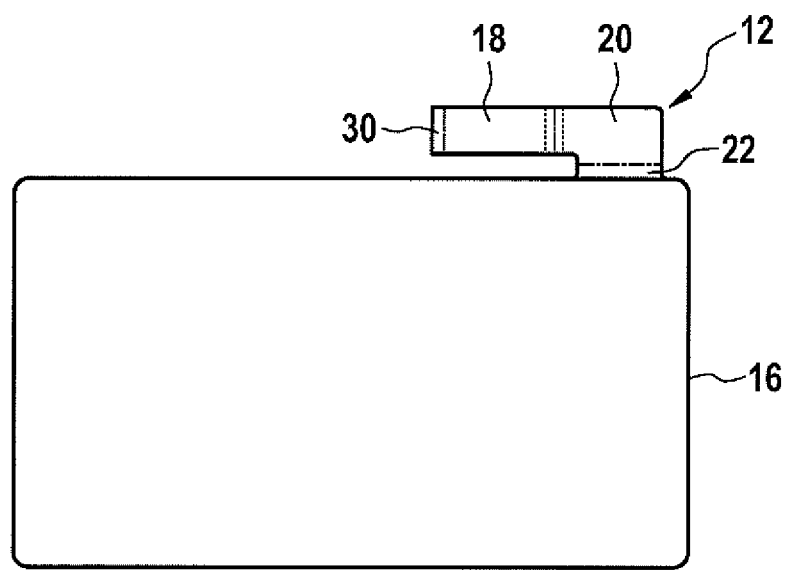
Figure 3A:
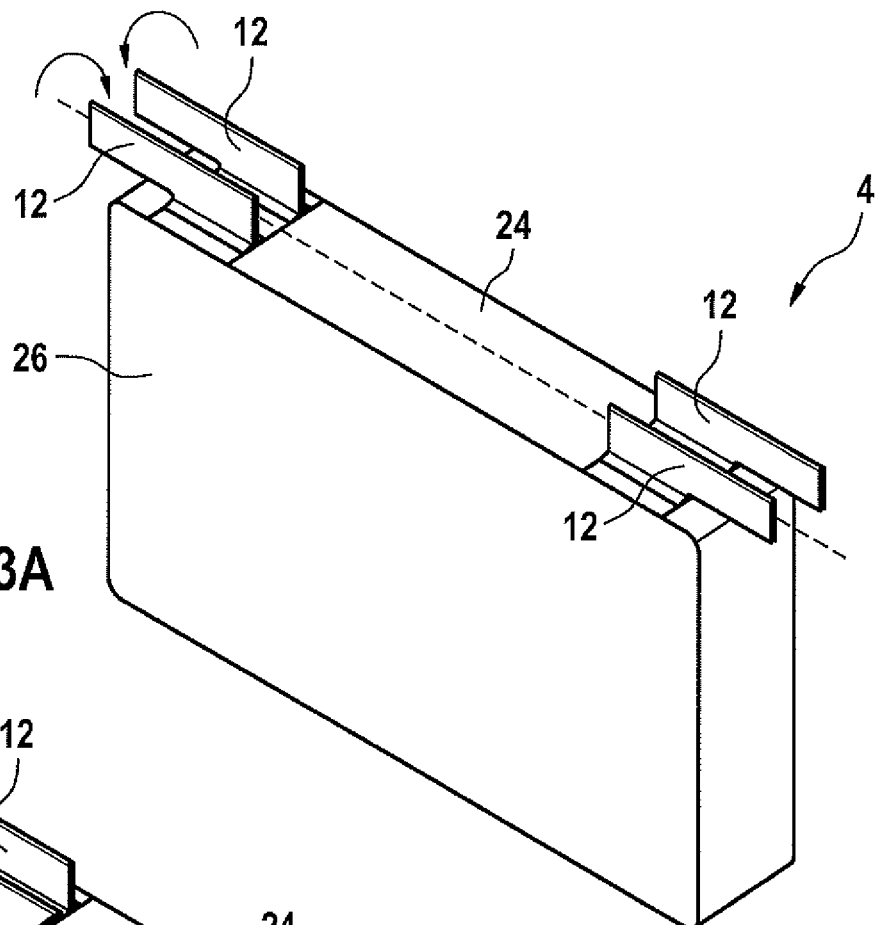
Figure 3B:
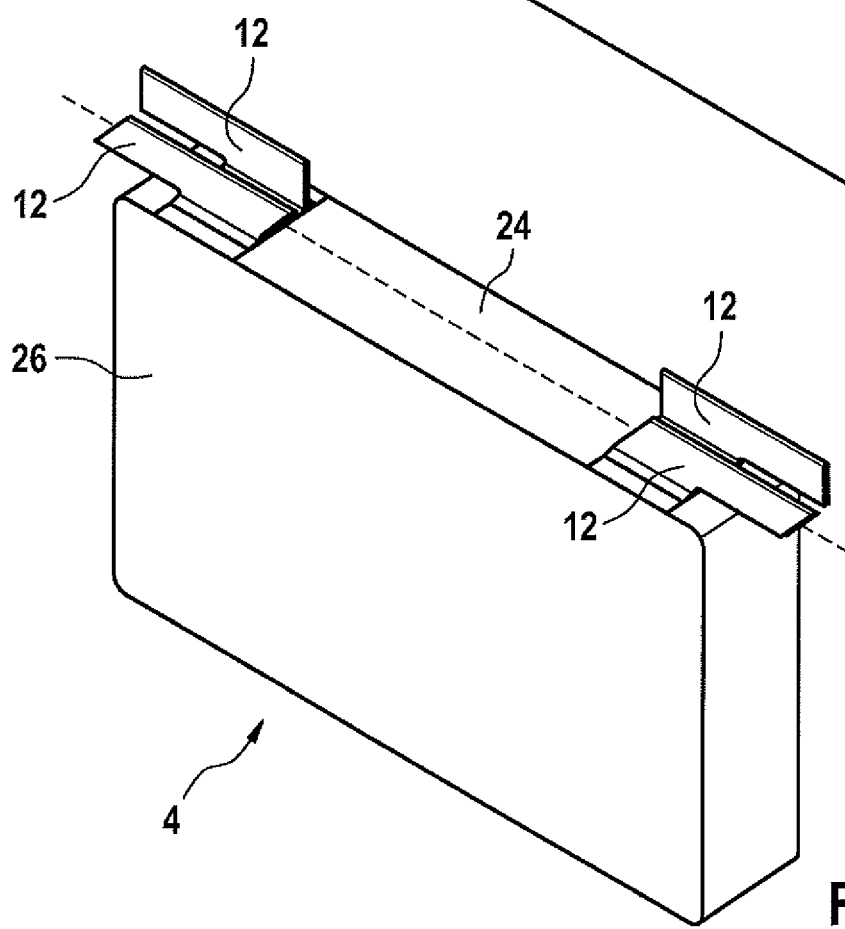
Figure 3C:
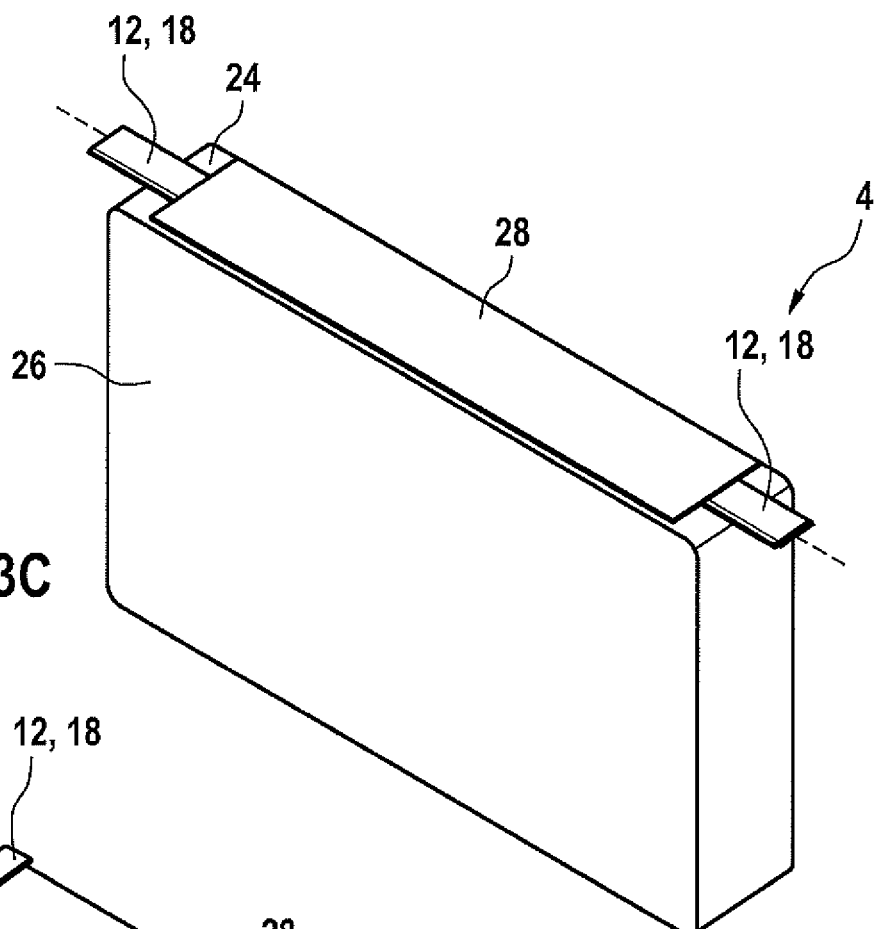
Figure 3D:
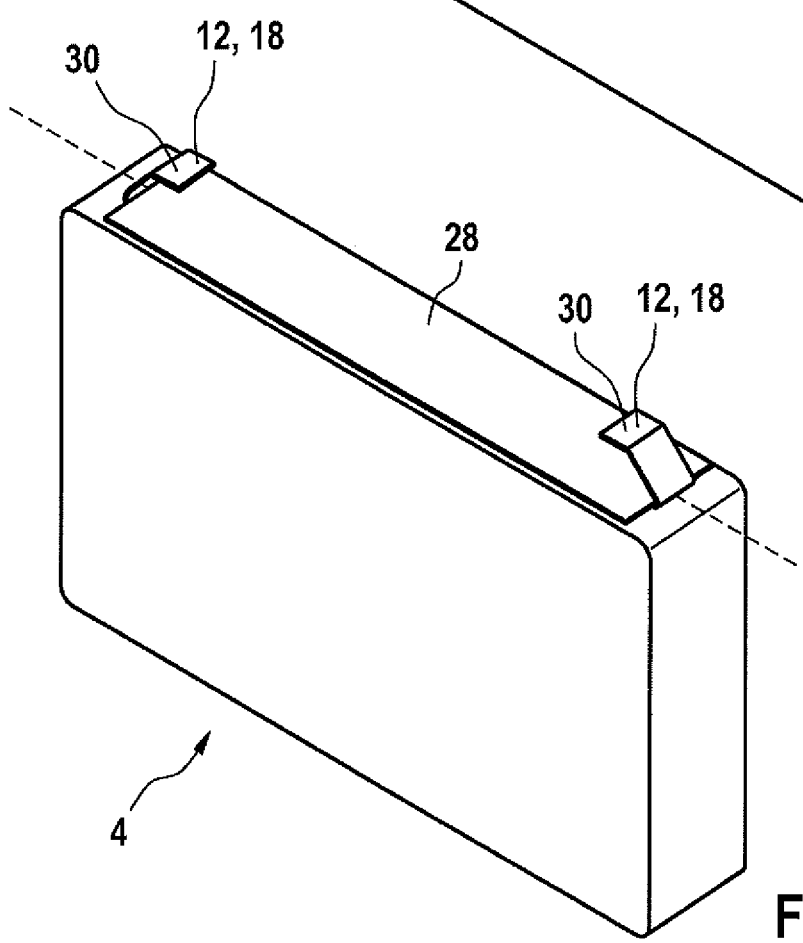
Figure 3E:
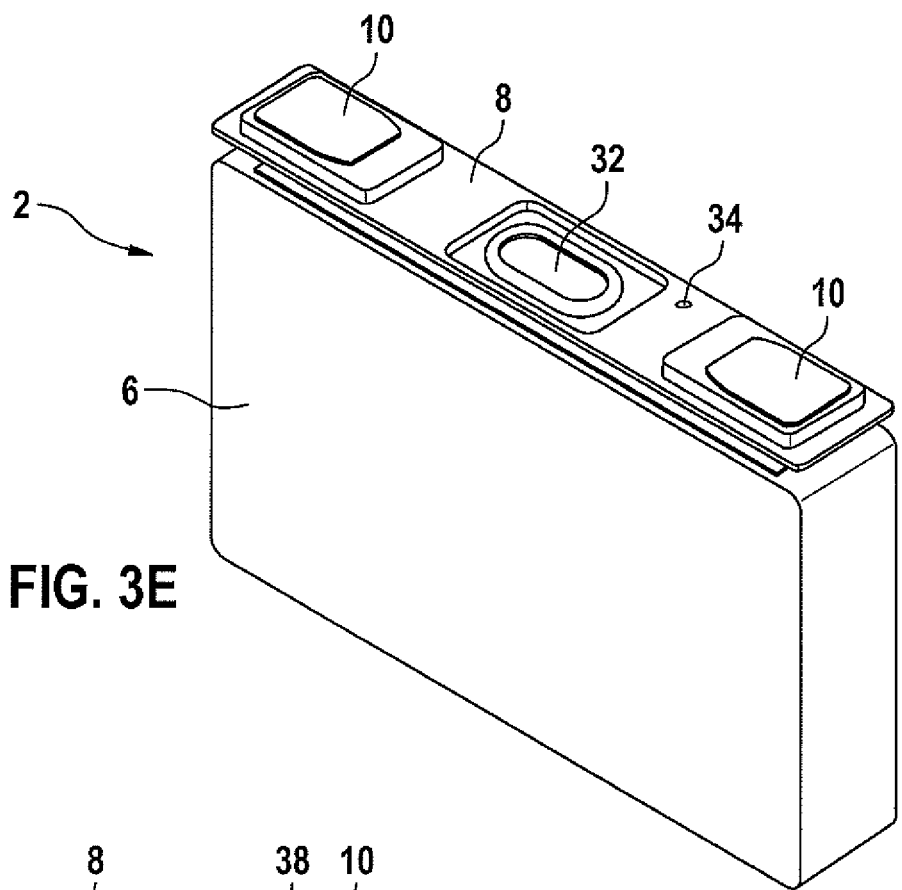
Figure 4A:
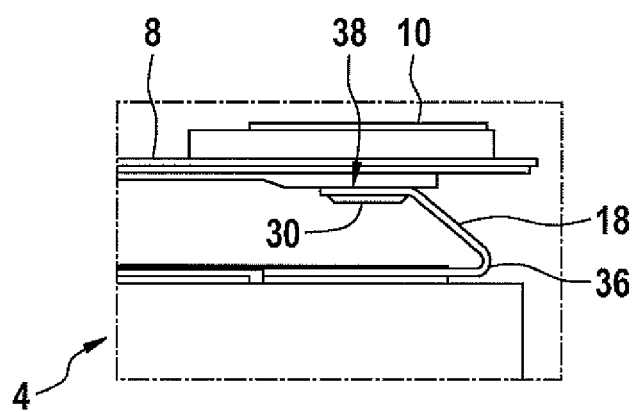
Figure 4B:
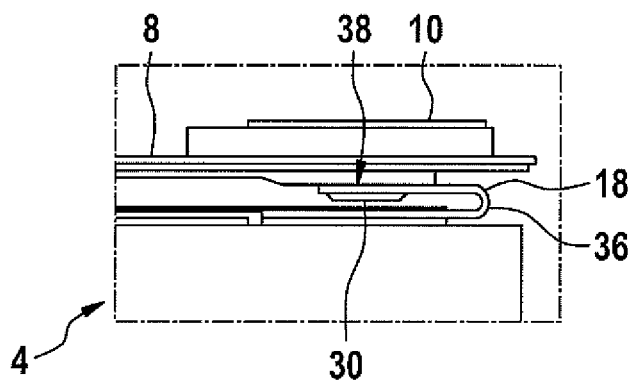
Figure 5:
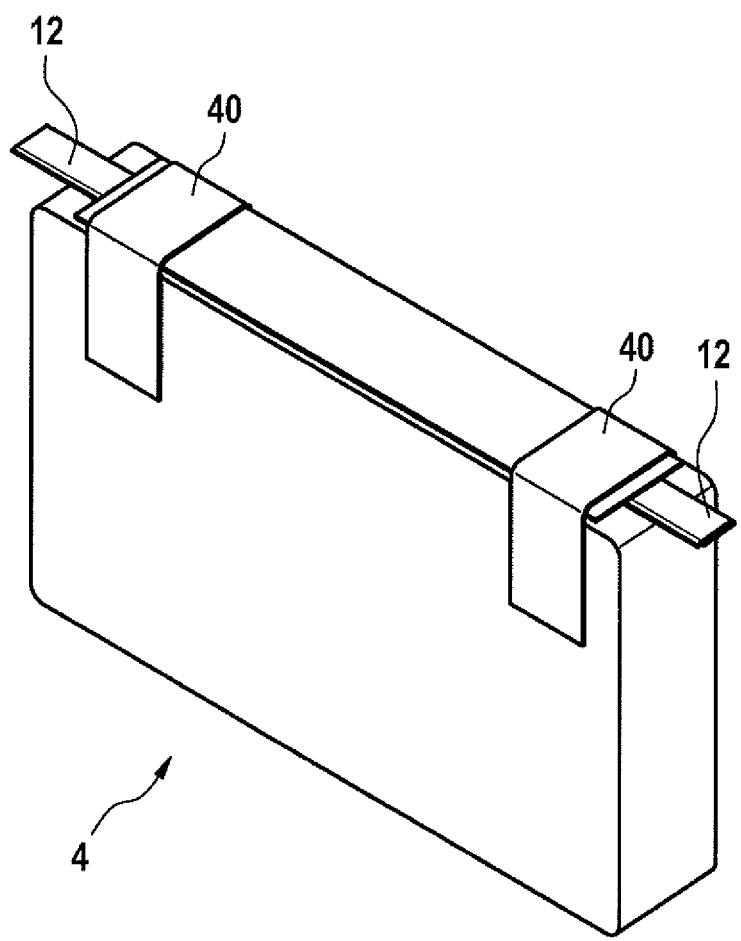

FIG. 1A shows a side view of a first electrode plate having an electrode tab according to a first embodiment of the invention, FIG. 1B shows a side view of a second electrode plate having an electrode tab according to a first embodiment of the invention, FIG. 2A shows a side view of a first electrode plate having an electrode tab according to a second embodiment of the invention, FIG. 2B shows a side view of a second electrode plate having an electrode tab according to a second embodiment of the invention, FIG. 3A shows a perspective view of an electrode assembly according to an embodiment of the invention at a first step of a manufacturing process, FIG. 3B shows a perspective view of an electrode assembly according to an embodiment of the invention at a second step of a manufacturing process, FIG. 3C shows a perspective view of an electrode assembly according to an embodiment of the invention at a third step of a manufacturing process, FIG. 3D shows a perspective view of an electrode assembly according to an embodiment of the invention at a fourth step of a manufacturing process, FIG. 3E shows a perspective view of an battery cell according to an embodiment of the invention at a fifth step of a manufacturing process, FIG. 4A shows a side view of an arrangement of a section of a cap assembly and a corner section of an electrode assembly according to an embodiment of the invention at a first step of its assembling process, and FIG. 4B shows a side view of an arrangement of a section of a cap assembly and a corner section of an electrode assembly according to an embodiment of the invention at a second step of its assembling process, FIG. 5 shows a perspective view of an electrode assembly according to another embodiment of the invention.

In the following description of the figures, same or similar features are provided with same or similar reference signs. In some cases, redundant description of components is avoided, in order to improve the clarity of the description.

FIG. 1A shows a side view of a first electrode plate 14 having an electrode tab 12 according to an embodiment of the invention. The first electrode plate 14, e.g. the anode, has a rectangular shape with sides a and b. The sides a and b can be of equal length. The electrode tab 12 is arranged in the corner of the first electrode plate 14. In the depicted embodiment, the electrode tab 12 is arranged close to the edge of the longer side a and protrudes therefrom.

Electrode tab 12 comprises a socket portion 22, a protruding portion 20, a bending portion 18 and a connecting portion 30. The protruding portion 20 defines the intermediate portion between the socket portion 22 and the bending portion 18. The bending portion 18 and connecting portion 30 are at a right angle to the socket portion 22. The connecting portion 30 is at the tip of the bending portion 18. Its function will be explained more in detail with regard to FIG. 4*d*.

FIG. 1B shows a side view of a second electrode plate 16 having an electrode tab 12 according to a first embodiment of the invention. The second electrode plate 16, e.g. the cathode, has a rectangular shape with sides a and b. The sides a and b can be of equal length. The electrode tab 12 also comprises the socket portion 22, the protruding portion 20 and the bending portion 18 with the connecting portions 30 as the tip of the electrode tab 12, as described with regards to FIG. 1A. The electrode tab 12 of the second electrode plate 16, however, is arranged opposed to the respective electrode tab 12 of the first electrode plate 14 of FIG. 1A. In both electrode plates 14, 16 the bending portion 18 extends over the edge of the side a.

FIGS. 2A and 2B show first and second electrode plates 14, 16 according to an alternative embodiment of the invention. The bending portion 18 and connecting portions 30 extend towards the center of the electrode plates 14 and 16, respectively.

FIGS. 3A to 3E show steps of manufacturing a battery cell 2.

FIG. 3A shows a perspective view of an electrode assembly 4 according to an embodiment of the invention at a first step of a manufacturing process. The electrode assembly 4 comprises a first stack 24 and a second stack 26 stacked on top of each other (from a layer perspective).

As shown by the flashes, the four electrode tabs 12 are folded inwards towards each other such that the electrode tabs 12 of the first stack 24 are folded onto the electrode tabs 12 of the second stack 26.

In more detail, the electrode tabs 12 of the second stack 26 are first folded down in the direction to the first stack 24. The result of this step is shown in FIG. 3B. Next, the electrode tabs 12 of the first stack 24 are folded onto the electrode tabs 12 of the second stack 26. The result of the step is shown in FIG. 3C.

In FIG. 3C, an isolating member 28 is arranged on the folded electrode tabs 12. The isolating member 28 may essentially cover the whole top surface of the electrode assembly 4.

FIG. 3D shows the electrode assembly 4 after bending the four electrode tabs 12 upwardly, i.e. in a direction normal to the first and second electrode plates 14, 16. The connecting portions 30 are now bent such that they extend parallel to the top surface of the electrode assembly 4.

FIG. 3E shows battery cell 2 comprising the battery case 6 and the cap assembly 8. The electrode assembly 4 (not depicted) is arranged in the battery case 6. The cap assembly 8 is positioned onto the electrode assembly 4.

The cap assembly 8 comprises positive and negative terminals 10 which are positioned close to the edge of the cap assembly 8 and opposed to each other. In the center of the cap assembly 8, a bursting membrane 32 is provided. Due to the external positioning of the terminals 10, the bursting membrane 32 can be freely designed, in particular regarding its form and position on the cap assembly 8. The cap assembly 8 further comprises a fill-in opening 34 for the liquid electrolyte.

The method of manufacturing the battery cell 2 may comprise the step of electrically connecting the electrode tabs 12 with the terminals 10 first and then housing the electrode assembly 4 (not depicted) in the battery case 6, or the steps being in the other order. The assembly steps may be followed by the step of filling the battery case 6 with a liquid electrolyte and by the step of sealing the battery case 6, e.g. by welding the battery case to the cap assembly 8.

FIG. 4A shows a side view of an arrangement of a section of the cap assembly 8 and a corner section of the electrode assembly 4 according to an embodiment of the invention at a first step of its assembling process. The bending portion 18 comprises a folding line 36, which is normal to the first and second electrode plates 14, 16.

The connecting portion 30 is connected with a respective connecting element 38 of the cap assembly 8, thereby providing the electrical connection to the terminal 10.

FIG. 4B shows a side view of an arrangement of a section of a cap assembly 8 and a corner section of an electrode assembly 4 according to an embodiment of the invention at a second step of its assembling process. In FIG. 4B, the cap assembly 8 is closely pressed to the electrode assembly 4 thus reducing the volume between them.

FIG. 5 shows a perspective view of an electrode assembly 4 according to another embodiment of the invention. The isolating member 28 is provided in form of two isolation tapes 40 applied on top of the electrode assembly. The isolation tapes 40 cover the areas where the electrode tabs 12 have been folded onto each other, e.g. the protruding portions 20.

The exemplary embodiments are not to be understood as limiting the invention. The person of skill in the art will readily be aware of a multitude of modifications which are in the scope of the present set of claims.

The invention claimed is:

1. A battery cell, the battery cell comprising an electrode assembly, a battery case for housing the electrode assembly and a cap assembly for closing the battery case, the cap assembly comprising a set of terminals arranged thereon, wherein the electrode assembly comprises first electrode plates, separator plates and second electrode plates, each of the plates defining a plane, with the plates stacked on one another with the respective planes of the plates parallel and facing to each other, wherein electrode tabs are provided to electrically connect the electrode assembly with the terminals, characterized in that the electrode tabs are bent at least once on a folding line that is perpendicular to the planes of the first and second electrode plates.

2. The battery cell according to claim 1, wherein the electrode assembly comprises a first and a second stack.

3. The battery cell according to claim 2, wherein the electrode tabs of the first stack are folded onto the electrode tabs of the second stack.

4. The battery cell according to claim 1, further comprising at least one isolating member arranged on the electrode tabs.

5. The battery cell according to claim 1, wherein the electrode tabs are provided at a corner of the electrode assembly.

6. Method of manufacturing a battery cell, the method comprising the steps of:
   providing an electrode assembly, where the electrode assembly comprises first electrode plates, separator plates and second electrode plates, each of the plates defining a plane, with the plates stacked on one another with the respective planes of the plates parallel to and facing each other, the first and second electrode plates being provided with electrode tabs for the external electric connection of the electrode assembly;
   bending the electrode tabs at least once on a folding line that is perpendicular to the planes of the first and second electrode plates,
   providing a cap assembly for closing the battery case, the cap assembly comprising a set of terminals arranged thereon,
   electrically connecting the electrode tabs with the terminals,
   providing a battery case for housing the electrode assembly,
   housing the electrode assembly in the battery case, and
   closing the battery case with the cap assembly.

7. The method of claim 6, wherein the electrode assembly comprises a first and a second stack and wherein the method further comprises the step of:
   folding the electrode tabs of the first stack onto the electrode tabs of the second stack, the step being followed by said step of bending the electrode tabs at least once in the direction normal to the first and second electrode plates.

8. The method of claim 6, wherein the electrode tabs extend over the edges of the electrode assembly before said step of bending the electrode tabs at least once on the folding line.

9. The method of claim 6, wherein the electrode tabs extend towards the center of the electrode assembly before said step of bending the electrode tabs at least once on the folding line.

10. The method of claim 6, wherein the step of electrically connecting the electrode tabs with the terminals comprises connecting the tabs with the terminal using laser welding, ultrasound welding or clinching technology.

11. The method of claim 7, wherein the electrode tabs extend over the edges of the electrode assembly before said step of bending the electrode tabs at least once on the folding line.

12. The method of claim 7, wherein the electrode tabs extend towards the center of the electrode assembly before said step of bending the electrode tabs at least once on the folding line.

13. The method of claim 7, wherein the step of electrically connecting the electrode tabs with the terminals comprises connecting the tabs with the terminal using laser welding, ultrasound welding or clinching technology.

14. The method of claim 8, wherein the step of electrically connecting the electrode tabs with the terminals comprises connecting the tabs with the terminal using laser welding, ultrasound welding or clinching technology.

15. The method of claim 9, wherein the step of electrically connecting the electrode tabs with the terminals comprises connecting the tabs with the terminal using laser welding, ultrasound welding or clinching technology.

* * * * *